United States Patent
Su et al.

(10) Patent No.: US 11,995,242 B2
(45) Date of Patent: May 28, 2024

(54) DETECTING CONTACTLESS GESTURES USING RADIO FREQUENCY

(71) Applicant: Google LLC, Mountain View, CA (US)

(72) Inventors: Wenjing Su, Mountain View, CA (US); Jiang Zhu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 347 days.

(21) Appl. No.: 17/419,364

(22) PCT Filed: Jul. 15, 2020

(86) PCT No.: PCT/US2020/042102
§ 371 (c)(1),
(2) Date: Jun. 29, 2021

(87) PCT Pub. No.: WO2022/015299
PCT Pub. Date: Jan. 20, 2022

(65) Prior Publication Data
US 2022/0179496 A1     Jun. 9, 2022

(51) Int. Cl.
*G06F 3/01* (2006.01)
*G06N 20/00* (2019.01)
(Continued)

(52) U.S. Cl.
CPC .............. *G06F 3/017* (2013.01); *G06N 20/00* (2019.01); *H04B 17/318* (2015.01);
(Continued)

(58) Field of Classification Search
CPC ...... H04R 1/10; H04R 1/1016; H04R 1/1025; H04R 1/1041; H04R 1/1075; H04R 29/00; H04R 29/001; H04R 29/004; H04R 2420/07; G06F 1/163; G06F 3/017; G06F 3/018; G06F 3/03; G06N 20/00; H04B 17/318
See application file for complete search history.

(56) References Cited

U.S. PATENT DOCUMENTS 9,940,827 B2 *  4/2018  Suomela .................. H04W 4/80
10,511,931 B1 * 12/2019  Khawand ................ H04W 4/02
(Continued)

FOREIGN PATENT DOCUMENTS

CN     105573498     5/2016
CN     105867625     8/2016
(Continued)

OTHER PUBLICATIONS

Invitation to Pay Additional Fees for International Application No. PCT/US2020/042102 dated Apr. 13, 2021. 13 pages.
(Continued)

*Primary Examiner* — Thang V Tran
(74) *Attorney, Agent, or Firm* — Colby Nipper PLLC

(57) ABSTRACT

The present disclosure provides for detection of input to a wireless device, such as earbuds or other wearable devices, based on RF signals between the earbuds and/or between an earbud and other devices, such as a host device. For example, gestures may be detected using signal strength, such as by using a received signal strength indicator (RSSI), between two earbuds and/or between an earbud and a host device.

20 Claims, 11 Drawing Sheets

(51) Int. Cl.
*H04B 17/318* (2015.01)
*H04R 1/10* (2006.01)
*H04R 29/00* (2006.01)

(52) U.S. Cl.
CPC ......... *H04R 1/1016* (2013.01); *H04R 1/1041* (2013.01); *H04R 29/001* (2013.01)

(56) References Cited

U.S. PATENT DOCUMENTS

| | | | |
|---|---|---|---|
| 11,451,897 B1* | 9/2022 | Chinnapalli | H04R 1/1041 |
| 11,533,116 B2* | 12/2022 | van Erven | H04W 16/225 |
| 11,632,614 B2* | 4/2023 | Tome | H04R 1/1041 381/74 |
| 2011/0092157 A1 | 4/2011 | Clark et al. | |
| 2014/0126759 A1 | 5/2014 | Rasmussen et al. | |
| 2015/0324004 A1 | 11/2015 | Lee et al. | |
| 2016/0259421 A1 | 9/2016 | Gollakota et al. | |
| 2017/0093846 A1 | 3/2017 | Lopez et al. | |
| 2017/0094385 A1 | 3/2017 | Lee et al. | |
| 2017/0126420 A1* | 5/2017 | Zhang | H04L 43/50 |
| 2017/0131395 A1 | 5/2017 | Reynolds et al. | |
| 2017/0230752 A1 | 8/2017 | Dohmen et al. | |
| 2018/0012228 A1 | 1/2018 | Milevski et al. | |
| 2018/0253151 A1 | 9/2018 | Kletsov et al. | |
| 2020/0333141 A1* | 10/2020 | Zhu | H04B 17/318 |
| 2022/0217464 A1* | 7/2022 | Xue | H04R 1/1041 |

FOREIGN PATENT DOCUMENTS

| | | |
|---|---|---|
| CN | 106155271 | 11/2016 |
| CN | 107102729 | 8/2017 |
| CN | 107809696 | 3/2018 |
| CN | 109240551 | 1/2019 |
| CN | 110069134 A | 7/2019 |
| WO | 2014048180 | 4/2014 |
| WO | 2021101674 | 5/2021 |

OTHER PUBLICATIONS

International Search Report and Written Opinion for International Application No. PCT/US2020/042102 dated Jun. 7, 2021. 19 pages.
Abdelnasser, et al., "WiGest: A Ubiquitous WiFi-based Gesture Recognition System", May 18, 2015, 10 pages.
Chen, et al., "Defending Against Identity-Based Attacks in Wireless Networks", Chapter 8, Dec. 2012, pp. 191-222.
"International Preliminary Report on Patentability", Application No. PCT/US2020/042102, dated Jan. 17, 2023, 12 pages.
"Foreign Office Action", EP Application No. 20750118.0, dated Sep. 4, 2023, 9 pages.
"Foreign Office Action", CN Application No. 202080009171.4, dated Nov. 8, 2023, 25 pages.
Chen, et al., "Robust Dynamic Hand Gesture Interaction using LTE Terminals", Jun. 9, 2020, 12 pages.
"Foreign Office Action", EP Application No. 20750118.0, Dec. 18, 2023, 17 pages.

* cited by examiner

DETECTING CONTACTLESS GESTURES USING RADIO FREQUENCY

CROSS-REFERENCE TO RELATED APPLICATION

This application is a national phase entry under 35 U.S.C. § 371 of International Application No.: PCT/US2020/042102, filed on Jul. 15, 2020, the entire disclosure of which is incorporated herein by reference.

BACKGROUND

Some wireless audio accessories, such as wireless earbuds, have antennas that enable transmission of signal over the air. Earbuds are usually equipped with several sensors to interact with the user and support smart features. To house the both sensors and antennas can be challenging. For example, the space available in the earbuds is small due to the constraints of the small form factor of the device. The compact size of the earbuds are important to the human factor such as comfortable fitting, stability during motion. Another challenge is the cost of wireless earbuds, which can be largely affected by components cost or manufacturing cost of the sensor or sensing structures. Yet another challenge is that the physical clearance between the antenna and other sensing components is small. The small clearance causes high radio frequency (RF) coupling between the antenna and the other sensing components, especially touch sensors. This leads to antenna performance degradation, large variations of the antenna's performance due to the large tolerance of other components in assembly, and potential impact on sensing performance.

Current techniques for sensing input to wireless audio accessories, such as earbuds, includes capacitor sensors, infrared (IR) sensors, etc. Traditional capacitor sensors use capacitive sensing to see if any fingers/hand is nearby. Traditional IR sensors use infrared light to detect the proximity of a surface, such as skin. But it is not capable of telling what specific surface it is, so the detection can be a false positive if the sensor is covered by fingers/other objects. Moreover, these techniques require special hardware components to enable the sensing, which is costly and takes a lot of precious space.

BRIEF SUMMARY

The present disclosure provides for using RF signals to detect input to wireless devices, such as wireless earbuds. For example, since an antenna is an essential component in wireless earbuds, it can be multifunctional to sense a status of the earbuds and to replace or assist traditional sensors.

One aspect of the disclosure provides a method for detecting input, the method including detecting, by a first device, a signal strength between the first device and a second device that is wirelessly coupled to the first device, identifying, by the first device, a change in the detected signal strength, and determining, by the first device based on the change in detected signal strength, a user input gesture corresponding to the change in detected signal strength. The first device may be a first earbud of a pair of earbuds while the second device is a second earbud of the pair of earbuds. The method may further include detecting, by the first device, a second signal strength between the first device and a host device, and identifying, by the first device, a change in the second signal strength, wherein determining the user input gesture is further based on the change in the second signal strength. The user input gesture may be a non-contact gesture, such as a swipe gesture or a hold gesture near the first device.

According to some examples, the method may further include detecting, by one or more sensors of the first device, user input, and correlating the detection of user input by the one or more sensors with the identified change in detected signal strength. For example, the one or more sensors may include a touch sensor, infrared sensor, etc.

According to some examples, the method may further include receiving, by the first device, training user input gestures for training a machine learning model, detecting, by the first device, changes in the signal strength when receiving the training user input gestures, and storing, in a memory of the first device, an indication of the training user input gestures and the detected changes in the signal strength. Further, when subsequent user input is received, the stored indication and detected changes in signal strength may be updated.

Another aspect of the disclosure provides a system, including a wearable wireless device, comprising memory, one or more processors, and a wireless interface for wirelessly communicating with at least one second device. The one or more processor of the wearable wireless device are configured to detect a signal strength between the first device and a second device that is wirelessly coupled to the first device, identify a change in the detected signal strength, and determine, based on the change in detected signal strength, a user input gesture corresponding to the change in detected signal strength. The wearable wireless device may be a first earbud of a pair of earbuds and the second device may be a second earbud of the pair of earbuds. The one or more processors of the wearable wireless device may be further configured to detect a second signal strength between the first device and a host device, and identify a change in the second signal strength, wherein determining the user input gesture is further based on the change in the second signal strength. The user input gesture may be a non-contact gesture, such as a swipe gesture or a hold gesture near the first device.

According to some examples, the wearable wireless device may further include one or more sensors, and the one or more processors of the wearable wireless device may be further configured to detect, using the one or more sensors, user input, and correlate the detection of user input by the one or more sensors with the identified change in detected signal strength. The sensors may include a touch sensor or an infrared sensor or any of a variety of other sensors.

According to some examples, the one or more processors of the wearable wireless device may be further configured to receive training user input gestures for training a machine learning model, detect changes in the signal strength when receiving the training user input gestures, and store in the memory an indication of the training user input gestures and the detected changes in the signal strength. The one or more processors of the wearable wireless device may be further configured to update the stored indication and detected changes in the signal strength when subsequent user input is received.

Yet another aspect of the disclosure provides a non-transitory computer-readable medium storing instructions executable by one or more processors for performing a method for detecting input. Such method may include detecting, by a first device, a signal strength between the first device and a second device that is wirelessly coupled to the first device, identifying, by the first device, a change in the detected signal strength, and determining, by the first device based on the change in detected signal strength, a user input gesture corresponding to the change in detected signal strength. The first device may be a first earbud of a pair of earbuds and the second device may be a second earbud of the pair of earbuds, and the method may further include detecting, by the first device, a second signal strength between the first device and a host device, and identifying, by the first device, a change in the second signal strength, wherein determining the user input gesture is further based on the change in the second signal strength.

DETAILED DESCRIPTION

The present disclosure provides for detection of input to a wireless device, such as earbuds or other wearable devices, based on RF signals between the earbuds and/or between an earbud and other devices, such as a host device. For example, gestures may be detected using signal strength, such as by using a received signal strength indicator (RSSI), between two earbuds and/or between an earbud and a host device.

The gestures may be, for example, non-contact gestures, such as holding a user's finger near the earbud, or moving the user's finger in a specified motion, such as a swipe, near the earbud. In other examples, the detected signal strength between earbuds or between an earbud and another device may be used to increase the accuracy of input detection by other sensors, such as touch sensors, infrared sensors, or the like. For example, changes in the detected signal strength may be correlated with the input received from the other sensors.

Machine learning and other post-processing techniques may be used to improve the sensing accuracy using signal strength. For example, the wireless device may be trained using an initial set of user input entered as training data. Moreover, as user input gestures are detected, the wireless device may update stored variations in signal strength correlated to input gestures.

Example Systems

Figure 1:
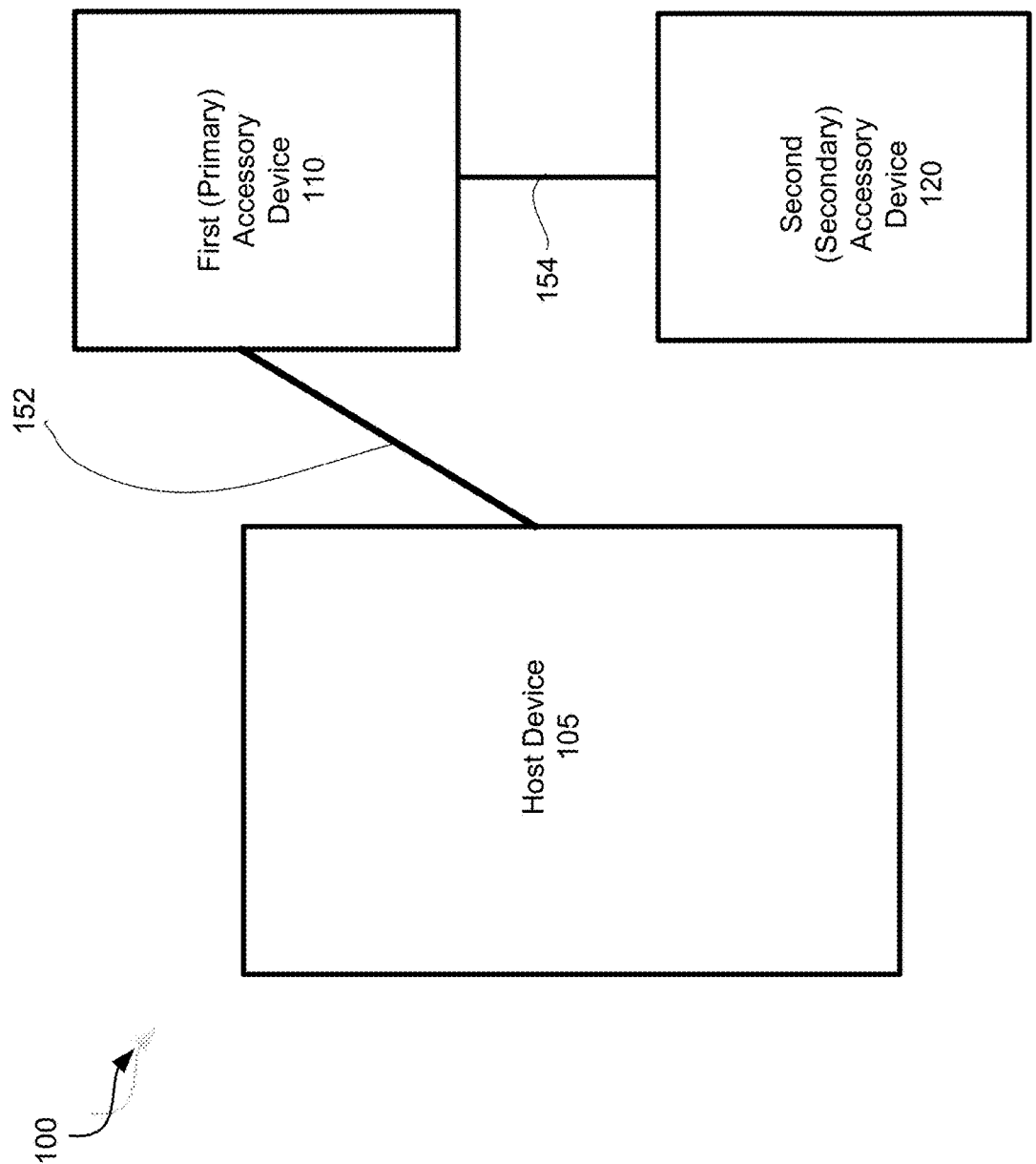
FIG. 1 is a block diagram illustrating an example system according to aspects of the disclosure.

FIG. 1 illustrates an example system 100 including a host device 105 communicatively coupled to first accessory device 110. The first accessory device 110 may be one of a pair of accessory devices, such as earbuds, wireless speakers, etc. The first device 110 may be operating in a primary role. As such, in addition to being coupled to the host device, the first device 110 is further communicatively coupled to second accessory device 120, which is operating in a secondary role.

The connection between the devices 105, 110, 120 may be, for example, short range wireless pairing, such as Bluetooth. For example, host device 105 may be coupled to first device 110 via a host communication link 152, such as a first asynchronous connection-less (ACL) link. The first device 110 may be coupled to the second device 120 via a relay communication link 154, such as a second ACL link.

Though not shown, the first and second devices may further include additional components, such as batteries, microphones, sensors for detecting conditions relative to the first and second devices, memories, etc. For example, each device may include sensors for detecting whether the device is being worn. Such sensors may include capacitive sensors, heat sensors, motion sensors, light sensors, accelerometers, or any other type of sensors. As another example, each device may include a memory storing historic information related to prior usage of the device. For example, the device may store information regarding typical days or times it is in use, a duration of time it is typically in use, signal strength, proximity to the host device, etc. Information from any of these other components, individually or in combination, may be used in some examples to assist in the detection of a user input command.

Figure 2:
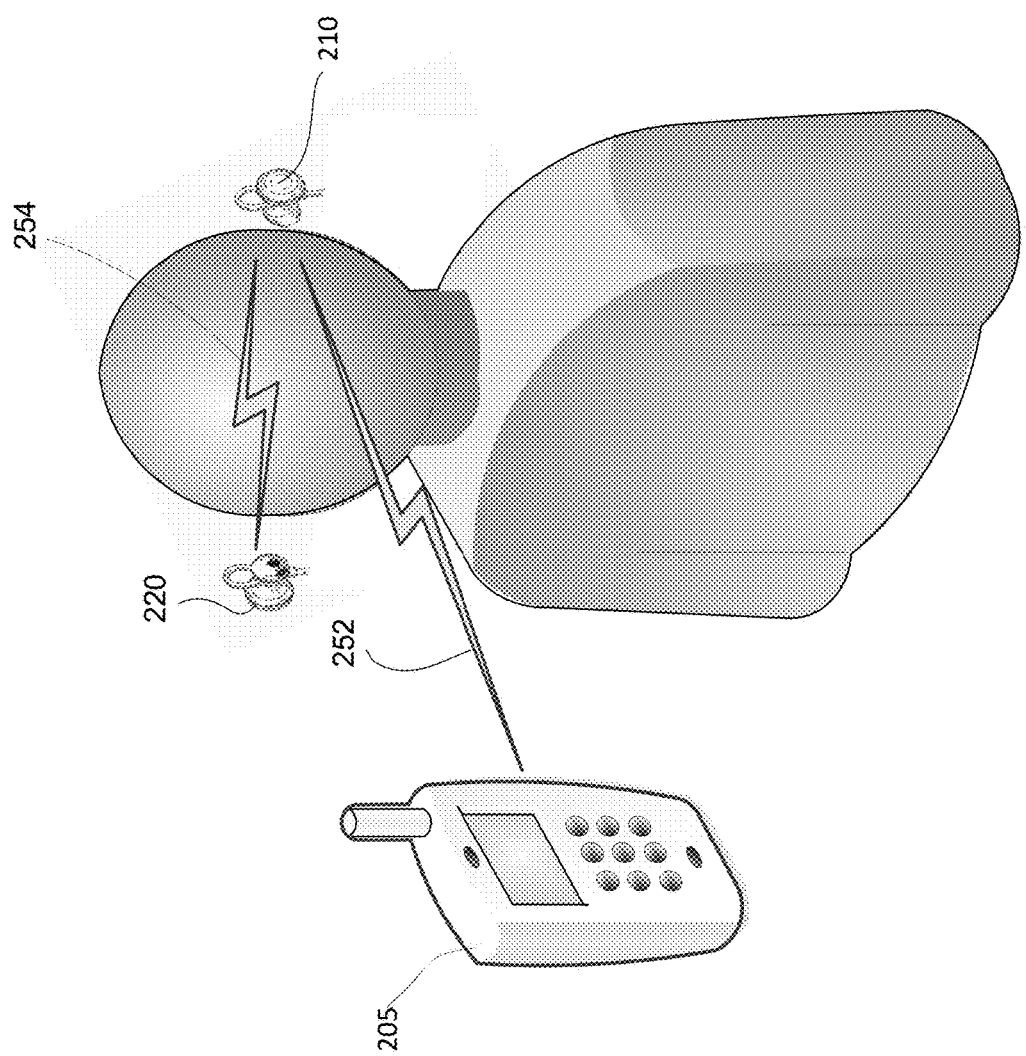
FIG. 2 is an example pictorial diagram of the system of FIG. 1.

FIG. 2 illustrates an example system, wherein the host device is a mobile phone 205, the first device operating in the primary role is a first earbud 210, and the second device operating in the secondary role is a second earbud 220. Host communication link 252 exists between the phone 205 and the first earbud 210, while relay communication link 254 exists between the first earbud 210 and the second earbud 220.

While the host device in this example is illustrated as a mobile phone, it should be understood that the host device may be any of various types of devices adapted to transmit audio signals. For example, the host device may be a tablet, smart watch, game system, music player, laptop, personal digital assistant device, or any other computing device. Similarly, the first and second accessories, while here shown as earbuds 210, 220, may in other examples be any combination of speakers or other audio devices, video output displays, etc. The first and second accessories may be paired during a time of manufacture, or may be sold separately and paired later by a user.

While in some examples the detection of user input commands may be made by both the first and second devices 210, 220, in other examples the detection may be made by only one or a subset of the devices.

Figure 3B:
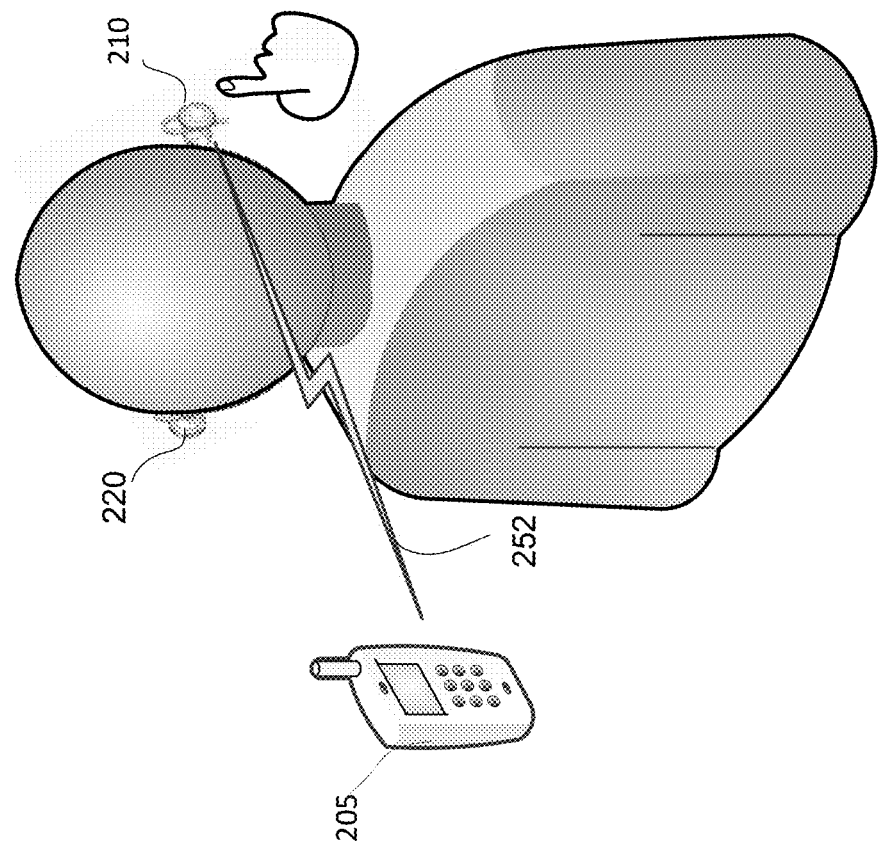
FIGS. 3A-C are pictorial diagrams illustrating an example gesture detected by changes in signal strength according to aspects of the disclosure.
Figure 3A:
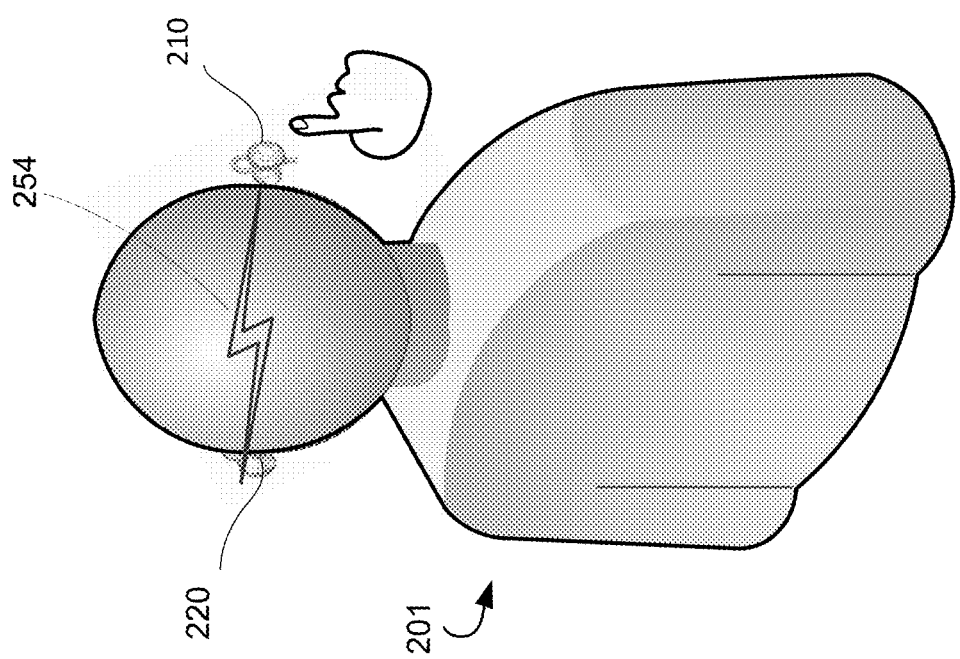
Figure 3C:
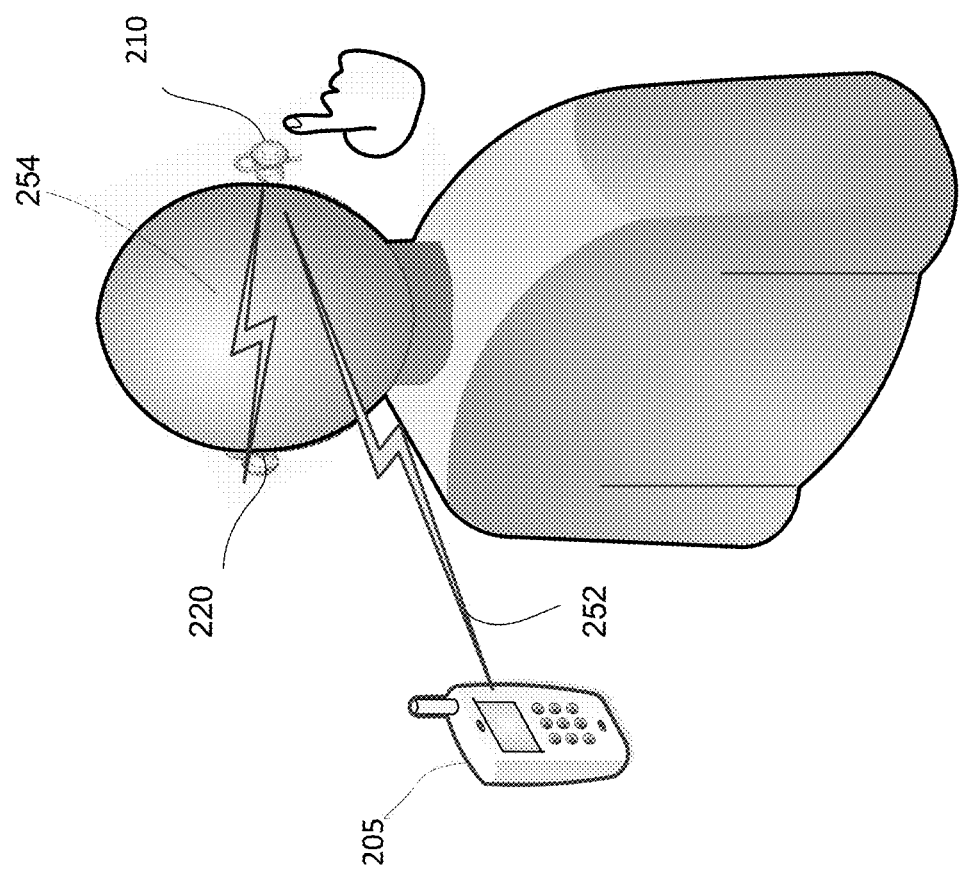

FIGS. 3A-C illustrate an example gesture as detected by variations in signal strength between different devices. In these examples, the gesture includes holding a finger near the first earbud 210, without contacting the first earbud 210. However, it should be understood that other gestures are also possible, such as particular movements of the hand or fingers. Examples of such other gestures include swiping, pinching, tapping, clenching, etc.

As seen in FIG. 3A, user 201 wearing first earbud 210 and second earbud 220 performs a non-contact hold gesture by placing a finger near the first earbud 210. When doing so, a signal strength over relay communication link 254 changes. Examples of how the signal strength changes for different gestures are described below in connection with FIGS. 5-8. The change in signal strength may be detected by monitoring RSSI, RF signal levels, or any of a variety of other indicia related to signal strength. The change in signal strength may be detected by, for example, the first earbud 210, the second earbud 220, or both. While the present example is described in connection with first and second earbuds, it should be appreciated that the change in signal strength may be detected between other types of wirelessly paired devices, such as left and right side audio output on smartglasses, smart motorcycle helmets, wireless speakers, etc. Moreover, the signal strength may be detected between two different types of devices, such as between smartglasses and an earbud.

FIG. 3B illustrates the hold gesture of the user's finger as detected by a change in signal strength over the host communication link 252. For example, when the user 201 places a finger near the outside of the first earbud 210, the signal strength over the host communication link 252 will change. The change in signal strength may be detected by, for example, the first earbud 210, the host device 205, or both. The first earbud 210 may, for example, compare the detected change in signal strength with an indication stored in memory of signal strength change corresponding to one or more gestures. Based on the comparison, the first earbud 210 may identify the gesture performed.

FIG. 3C illustrates a non-contact hold gesture detected using a combination of signal strength over the relay link 254 and signal strength over the host communication link 252. By way of example, the first earbud 210 may detect a first change in signal strength over the relay link 254, and a second change in signal strength over the host communication link 252. Based on timing and magnitude of the first and second changes, the first earbud 210 may determine that the changes in signal strength correspond to a hold gesture. For example, the first earbud 210 may correlate the two detected changes in signal strength, and determine the gesture performed based on the correlation. As one example, if the two changes in signal strength occur at the same time and last for the same duration, the first earbud 210 may confirm that a gesture has been detected. The degree to which the first and second changes occur, such as the degree of decrease in signal strength, may be used to identify the particular gesture. For example, a hold gesture may impact signal strength to a different degree and/or for a different duration of time than a swipe gesture.

Figure 4:
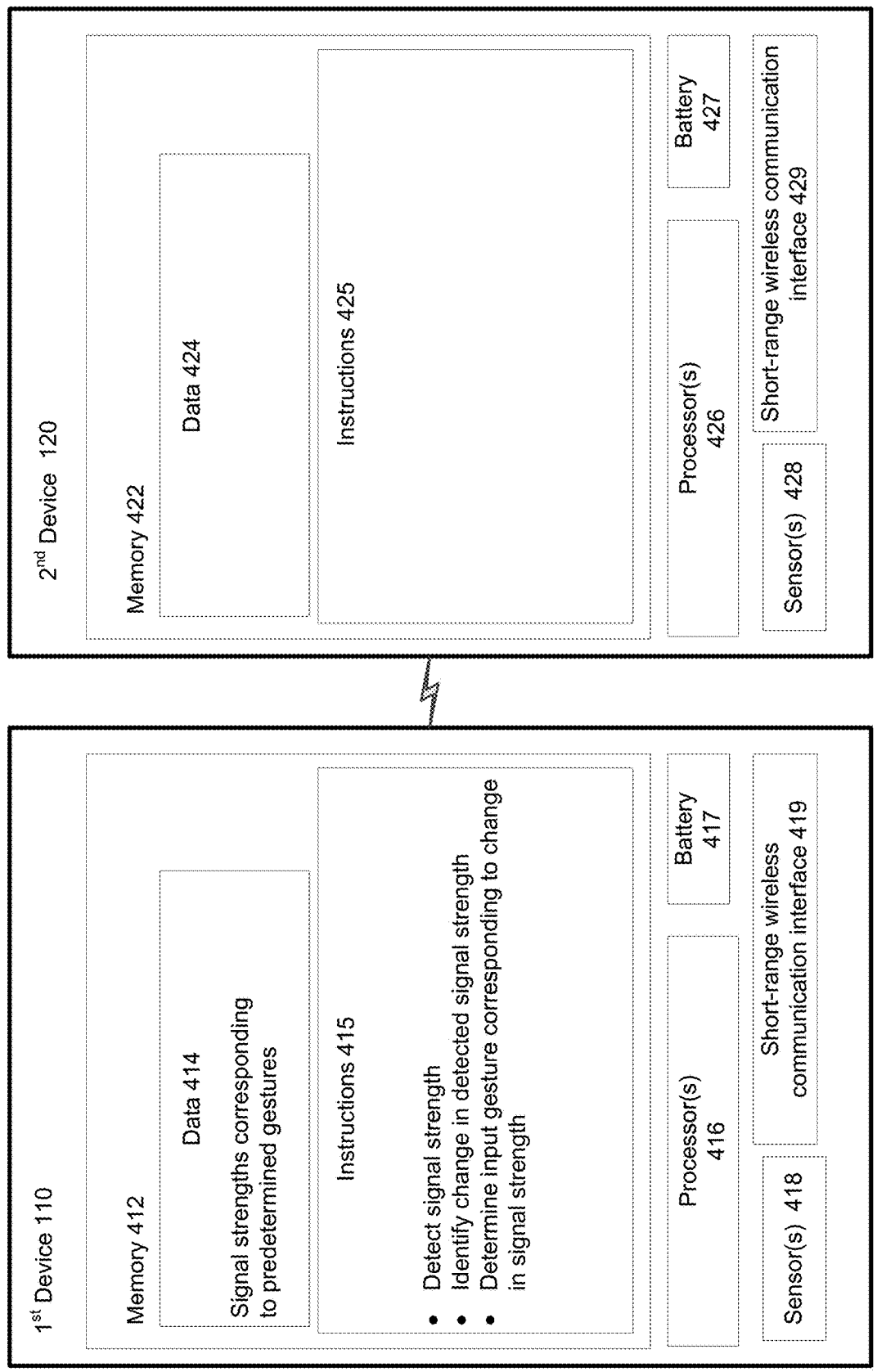
FIG. 4 is a functional block diagram illustrating an example system according to aspects of the disclosure.

FIG. 4 illustrates an example of internal components of the first device 110 and second device 120. While a number of internal components are shown, it should be understood that additional or fewer components may be included. By way of example only, the devices may include components typically found in playback devices, such as speakers, microphones, etc. The devices may be, for example, wireless accessories, such as earbuds, speakers, displays, etc. The devices are primarily described below with respect to the first device 110. While the second device 120 may be similar or identical to the first device 110 in some examples, in other examples the second device 120 may be a different type of device. Additionally or alternatively, the second device 120 may have different internal components.

The first device 110 may include one or more processors 416, one or more memories 412, as well as other components. For example, the computing device 110 may include one or more sensors 418, wireless pairing interface 419, and a battery 417.

The memory 412 may store information accessible by the one or more processors 416, including data 414 instructions 415 that may be executed or otherwise used by the one or more processors 416. For example, memory 412 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 412 may be a static random-access memory (SRAM) configured to provide fast lookups. Systems and methods may include different combinations of the foregoing, whereby different portions of the instructions and data are stored on different types of media.

The data 414 may be retrieved, stored or modified by the one or more processors 416 in accordance with the instructions 415. For instance, data 414 may include short range wireless communication profiles, such as Bluetooth profiles. The data 414 may further include buffered packets, such as an audio buffer with packets received from a host device. Although the claimed subject matter is not limited by any particular data structure, the data may be stored in computing device registers, in a relational database as a table having a plurality of different fields and records, XML documents or flat files. The data may also be formatted in any computing device-readable format.

The instructions 415 may be any set of instructions to be executed directly (such as machine code) or indirectly (such as scripts) by the one or more processors 416. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 416 may be microprocessors, logic circuitry (e.g., logic gates, flip-flops, etc.) hard-wired into the device 110 itself, or may be a dedicated application specific integrated circuit (ASIC). It should be understood that the one or more processors 416 are not limited to hard-wired logic circuitry, but may also include any commercially available processing unit, or any hardware-based processors, such as a field programmable gate array (FPGA). In some examples, the one or more processors 416 may include a state machine. The processors 416 may be configured to execute the instruction 415 to, for example, perform a method such as described below in connection with FIG. 5.

The one or more sensors 418 may include any of a variety of mechanical or electromechanical sensors for performing various functions. Such sensors may include, for example, an accelerometer, gyroscope, switch, light sensor, barometer, audio sensor (e.g., microphone), vibration sensor, heat sensor, radio frequency (RF) sensor, etc.

The short range wireless pairing interface 419 may be used to form connections with other devices, such as paired second device 120 or a host device, such as a mobile phone providing the audio packets. The connection may be, for example, a Bluetooth connection or any other type of wireless pairing. By way of example only, each connection may include an ACL link. The short range wireless pairing interface 419 may include, for example, an antenna, a transceiver, or other tools for establishing a wireless connection with another earbud, with a host device, and/or with other types of nearby devices. According to some examples, the short range wireless pairing interface 419 may also be adapted to detect changes in signal strength over the wireless connections between such devices.

Although FIG. 4 functionally illustrates the processor, memory, and other elements of device 110 as being within the same block, it will be understood by those of ordinary skill in the art that the processor and memory may actually include multiple processors and memories that may or may not be stored within the same physical housing. For example, memory 412 may be a volatile memory or other type of memory located in a casing different from that of computing device 110. Moreover, the various components described above may be part of one or more electronic devices.

In this example, the second device 120 has an internal architecture similar to that of the device 110. For example, the second device 120 includes a memory 422 storing data 424 and instructions 425 which may be executed by one or more processors 426. The second device 120 further includes a battery 427, sensors 428, a communication interface 429, such as a Bluetooth interface, etc.

As mentioned above, the instructions 415 and 425 may be executed to determine a gesture input by a user of the first and second devices. For example, one or both of the first and second devices 110, 120 may detect a change in signal strength between the first and second devices 110, 120. In some examples, the first or second devices 110, 120 may additionally or alternatively detect changes in signal strength over communication links with other devices. The detected change in signal strength may be used to identify an input gesture, such as a non-contact input gesture, made by a user of the first and second devices 110, 120. For example, the detected change in signal strength may be compared to information stored in data 414, such as profiles of signal strength changes corresponding to particular gestures. Based on the comparison, the device may determine which gesture was input.

According to some examples, the detected change in signal strength may be analyzed in combination with other input detection, such as input to a touch sensor, IR sensor, etc. For example, the detected change in signal strength may be correlated with input received by the other sensors. This may include confirming that a timing of the signal strength change corresponds to a timing of the receipt of other sensor input, and that a degree of the signal strength change corresponds to a gesture that is consistent with entering input to the other sensor. For example, the change in signal strength may indicate a gesture of holding the user's finger over the first device, and may be used to confirm that the user pressed a touch sensor on an outer surface of the first device. In this regard, false positive detection of input may be reduced.

Figure 5:
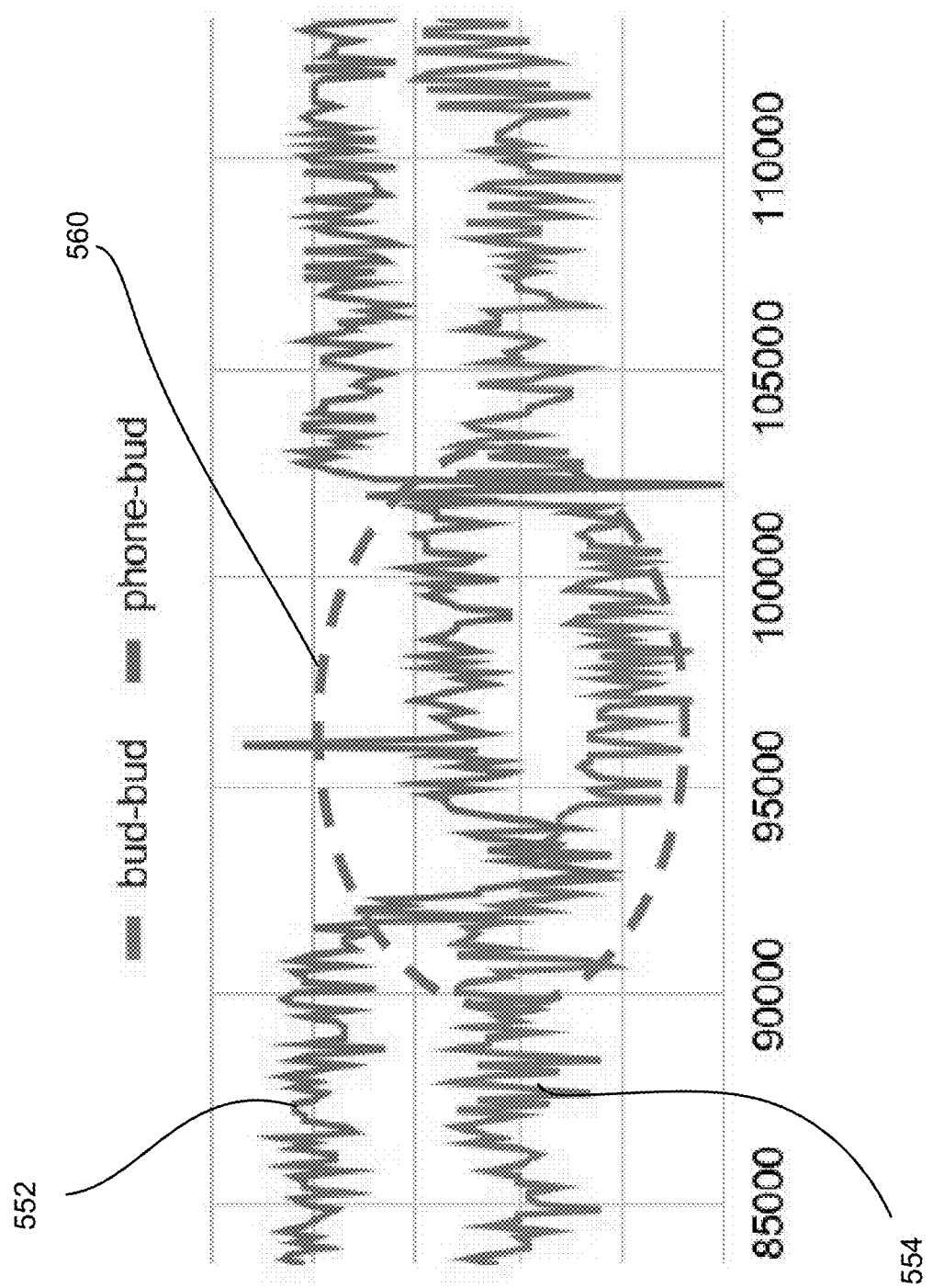
FIGS. 5-8 illustrate example variations in signal strength corresponding to different gestures according to aspects of the disclosure.

FIG. 5 illustrates an example change in signal strength corresponding to a non-contact hold gesture near a wireless device, such as an earbud. Signal 552 indicates the signal strength between the earbud and the host device, whereas signal 554 indicates the signal strength between two earbuds. For each of FIGS. 5-9, the x-axis indicates time while the y-axis represents RSSI. Generally, RSSI between the earbud and the host device is higher than the RSSI between the two earbuds. However, at portion 560 which corresponds to input of the non-contact hold gesture, the RSSI of both connections drops. The RSSI between the earbud and host device drops significantly at a beginning and end of the gesture, at some times to a degree at or below the RSSI of the two-earbud connection. The RSSI of the two-earbud connection drops at a beginning of the gesture and then remains relatively steady until it increases again toward the end of the gesture.

Figure 6:
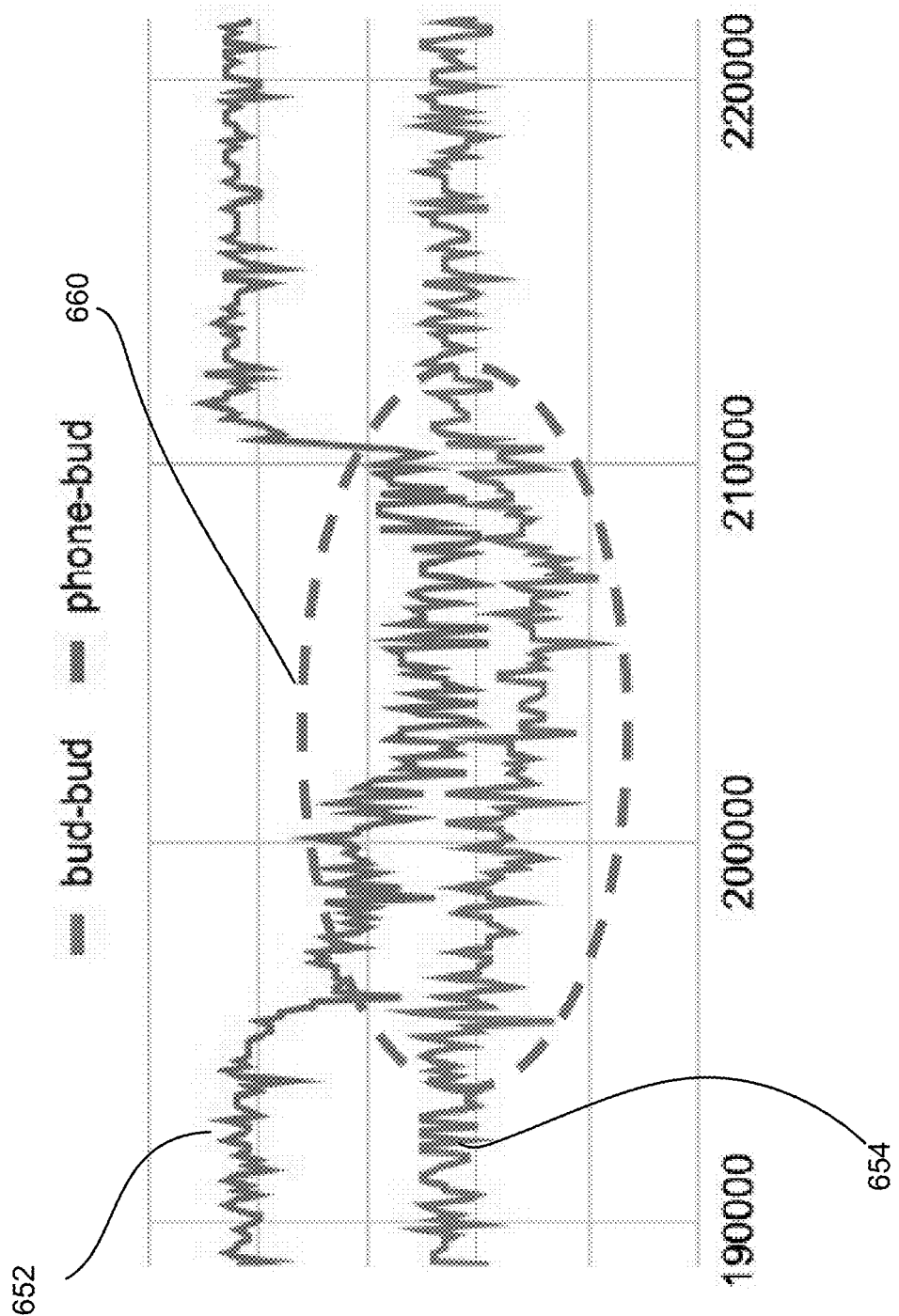

FIG. 6 illustrates an example change in signal strength corresponding to a touch and hold gesture, where the user's finger directly contacts a surface of the earbud to provide input. Similar to FIG. 5, signal 652 represents RSSI over the earbud-host connection, while signal 654 represents RSSI over the earbud-earbud connection. Portion 660 corresponds to input of the gesture, where both signals 652, 654 drop and then increase again when the gesture is over.

Figure 7:
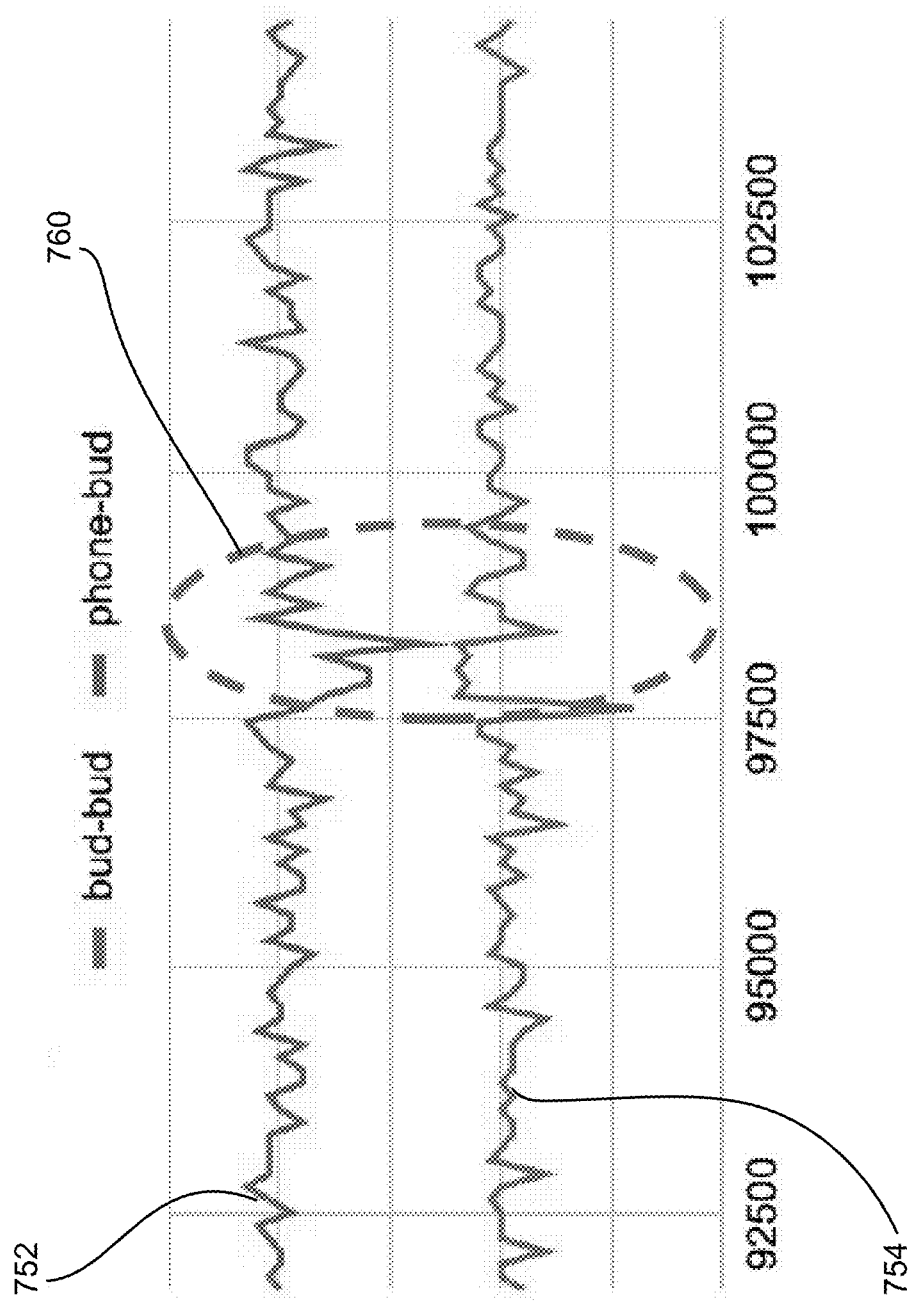

FIG. 7 illustrates an example change in signal strength corresponding to a swipe gesture. As seen from portion 760 corresponding to a time of input of the gesture, the duration of the gesture is shorter relative to the duration of the gestures in FIGS. 5-6. As such, the change in signal strength of signals 752 for the earbud-host connection and 754 for the earbud-earbud connection is represented by more of a downward spike shortly after time 97500, as opposed to a prolonged drop.

Figure 8:
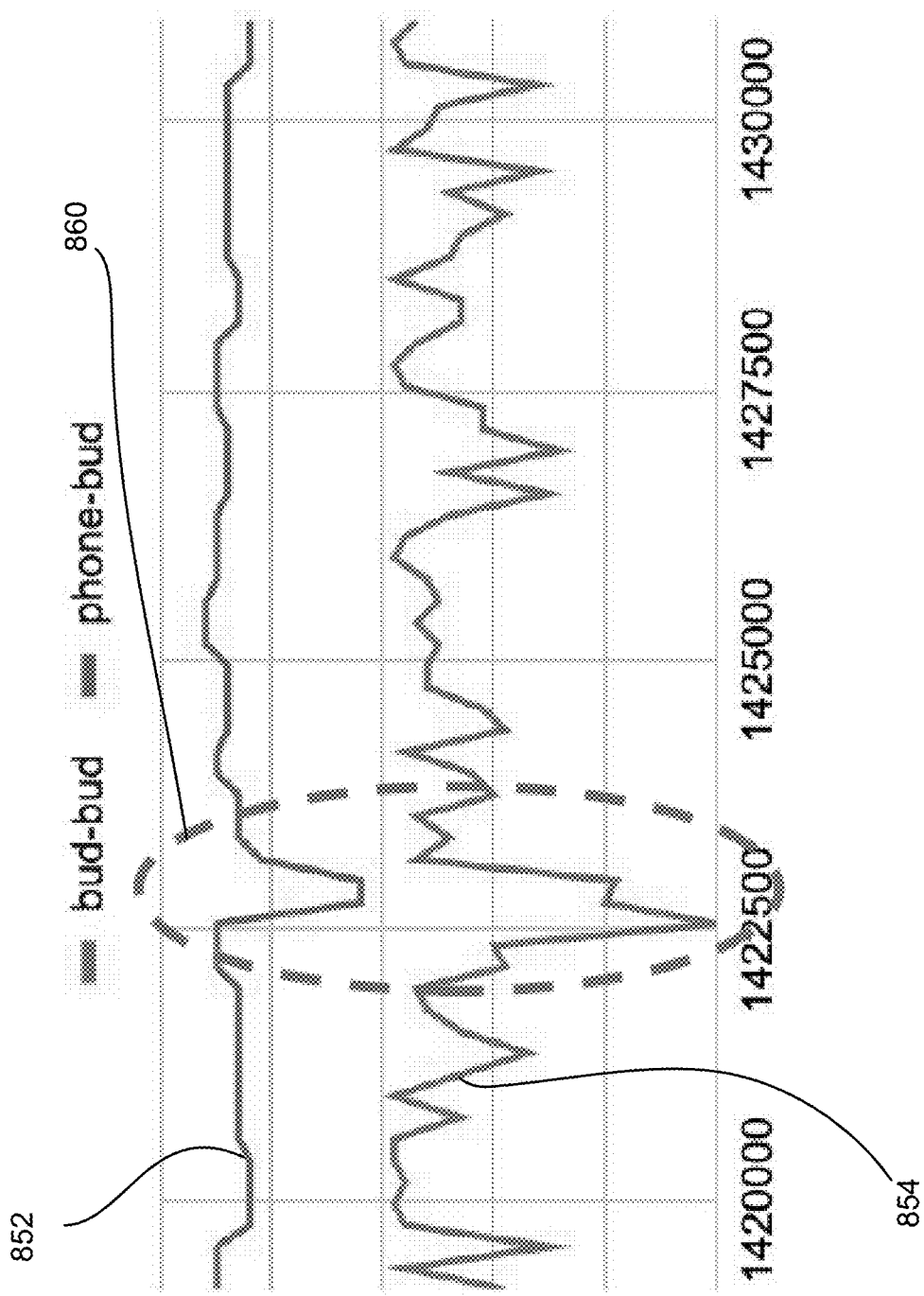

FIG. 8 illustrates an example change in signal strength corresponding to a single tap gesture. Similar to the swipe gesture of FIG. 7, portion 860 corresponding to a time of the tap gesture is relatively short in duration. In this portion, signal 852 corresponding to the earbud-host RSSI and signal 854 corresponding to the earbud-earbud RSSI drop quickly and significantly, before soon rising back to its normal level.

While several examples of gestures are described above, it should be understood that these examples are not limiting, and that numerous other types of gestures can be detected through changes in signal strength. In addition to detecting gestures, the changes in signal strength may be used to determine a wear status of the earbuds or other wearable devices. The wear status indicates whether or not the earbuds or other wireless devices are being worn by the user.

Figure 9:
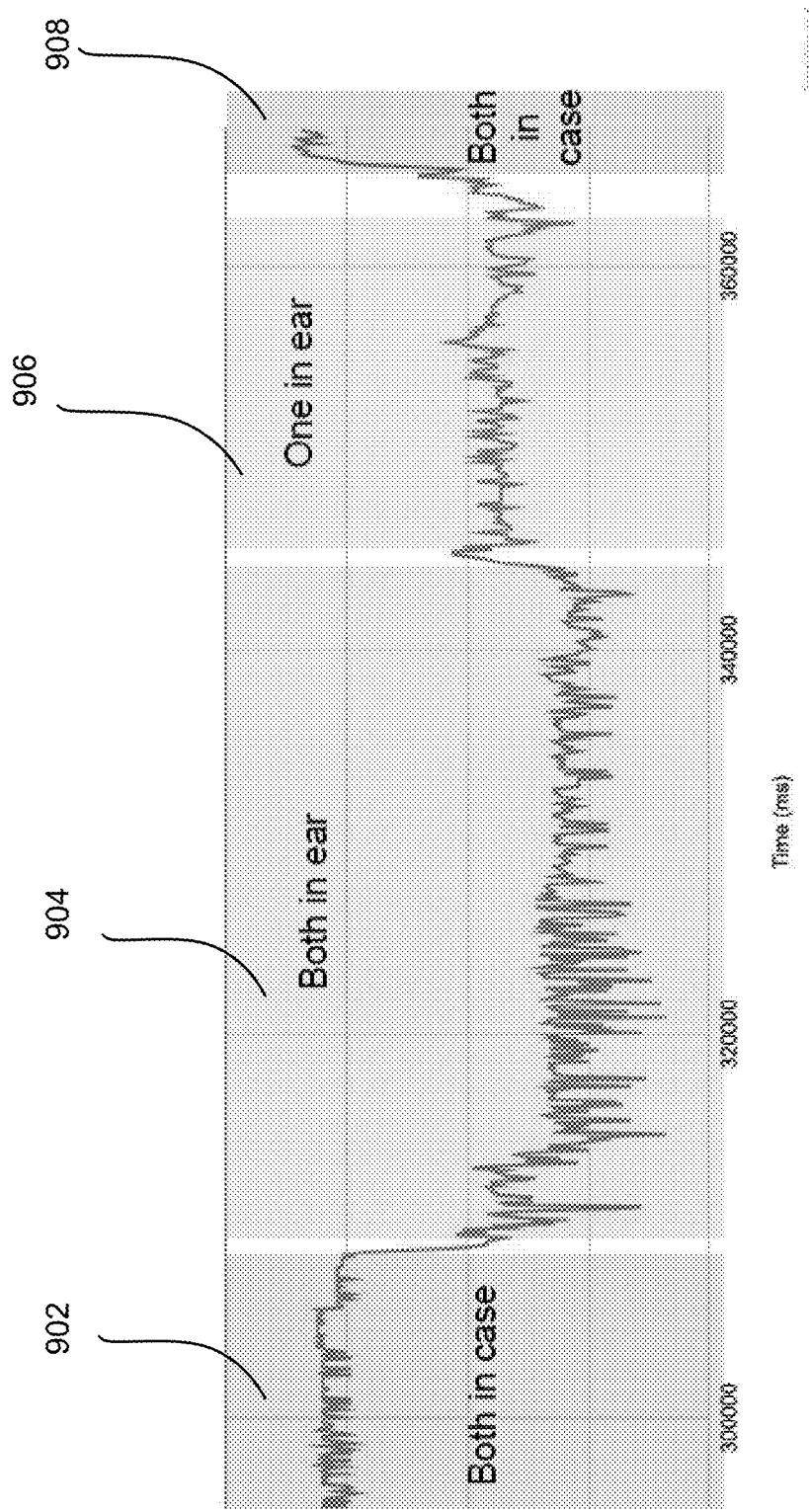
FIG. 9 illustrates example variations in signal strength corresponding to a wear status of a wearable device according to aspects of the disclosure.

FIG. 9 illustrates example variations in signal strength corresponding to a wear status of a wearable device. At time 902, the RSSI between the two earbuds is at a first level that corresponds to both earbuds being within a case. At time 904, when both earbuds are inserted into the user's ears, the RSSI drops to a second level. When only one bud is worn, such as at time 906, the RSSI increase to a third level. When both earbuds are placed back in the case at time 908, the RSSI returns to the first level. Accordingly, in addition to being used to detect user input, the RSSI may also be used to detect a wear state of the wireless devices.

Example Methods

Figure 10:
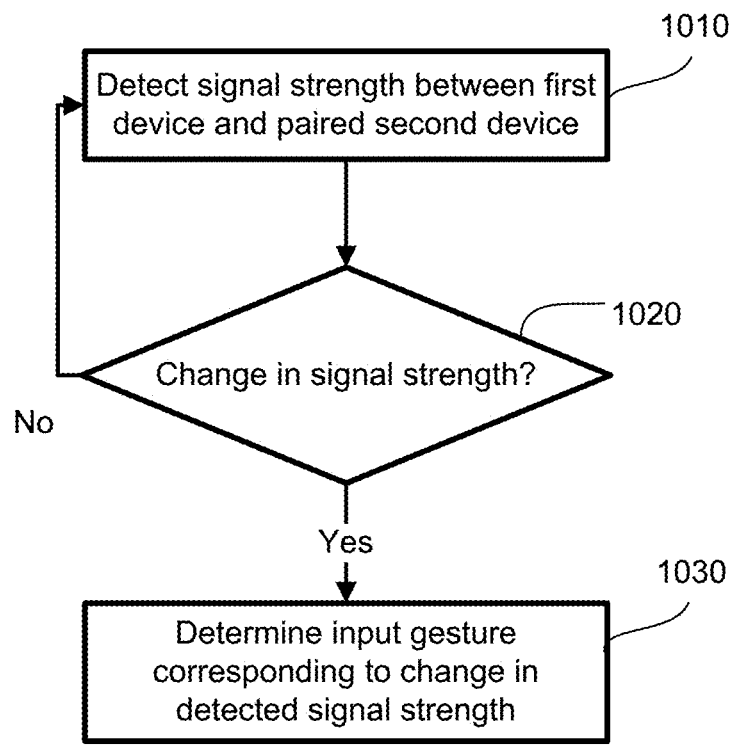
FIG. 10 is a flow diagram illustrating an example method according to aspects of the disclosure.

FIG. 10 is a flow diagram illustrating an example method 900 of detecting, using RF signals, a gesture input by a user. While the operations are illustrated and described in a particular order, it should be understood that the order may be modified and that operations may be added or omitted.

In block 1010, signal strength is detected between first and second wirelessly paired devices. The devices may be, for example, a pair of earbuds. According to some examples, the signal strength between other devices, such as between an earbud and a host device or phone, may additionally or alternatively be detected.

In block 1020, it is determined whether there is a change in the detected signal strength. If so, it may be further be determined whether the change is a result of user input gesture. If there is no change, the method may return to block 1010 to continue detecting signal strength.

If a change in signal strength is detected, block 1030 provides for determining the input gesture corresponding to the change. By way of example, the device may store profiles for different input gestures, each profile including an indication of how signal strength changes when the input gesture is performed. In this regard, the device may compare the detected change in signal strength with the one or more stored profiles, and select the profile most closely corresponding to the detected change. The gesture corresponding to the selected profile may be determined to be the gesture input to the device. Each gesture may also correspond to a particular input command. For example, an input command may instruct the device to increase/decrease volume, output different content (e.g., skip to the next song), change modes, such as by switching to a low power mode, an audio spatialization mode, etc. Accordingly, once the input gesture is determined, the command corresponding to that gesture may be executed by the device.

According to some examples, machine learning techniques may be used to more accurately detect user gesture input using changes in detected signal strength. By way of example, the user may enter training data for training detection by the device. For example, the user may be prompted to perform a variety of gestures. The device may detect each gesture performed by the user, and store information corresponding to the change in signal strength at a time when the gesture was performed. In this regard, the detect may be more specific to the user. Thus, if one user tends to have slightly different finger placement or finger movement when performing gestures, or if a size/shape of the user's hand or other factors impact signal strength, the gestures of the particular user may still be accurately detected. Moreover, the device may continually update as gestures are performed. For example, over time as the user performs a gesture many times, the user's movement may tend to become more casual or less pronounced. The device may update signal strength profiles stored in memory to correspond to the more casual or less pronounced movements of the user.

The foregoing systems and methods are advantageous in that enable detection of contactless input gestures from a user, while also maintaining a small form factor of the devices. By using the antenna to both receive content, such as audio packets, as well as to detect input gestures, other sensors traditionally used for input detection may be reduced or eliminated.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for detecting input, the method comprising:
receiving a machine-learned model, the machine-learned model trained based on:
training user input gestures, the training user input gestures including at least one training user input gesture received by a first device; and
a detected change in a training signal strength during the reception by the first device of the at least one training user input gesture;
detecting, by the first device, a first signal strength between the first device and a second device that is wirelessly coupled to the first device;
identifying, by the first device, a change in the detected first signal strength; and
determining, by the first device based on the change in the detected first signal strength and using the machine-learned model trained based on the at least one training user input gesture received by the first device and the detected change in the training signal strength, a user input gesture corresponding to the change in the detected first signal strength.

2. The method of claim 1 wherein the first device is a first earbud of a pair of earbuds and the second device is a second earbud of the pair of earbuds.

3. The method of claim 1, further comprising:
detecting, by the first device, a second signal strength between the first device and a host device; and
identifying, by the first device, a change in the detected second signal strength;
wherein determining the user input gesture is further based on the change in the detected second signal strength.

4. The method of claim 1, wherein the user input gesture is a non-contact gesture.

5. The method of claim 4, wherein the non-contact gesture includes one of a swipe gesture or a hold gesture near the first device.

6. The method of claim 1, further comprising:
detecting, by one or more sensors of the first device, the user input gesture; and
correlating the detection of the user input gesture by the one or more sensors with the identified change in the detected first signal strength.

7. The method of claim 6, wherein the one or more sensors include at least one of a touch sensor or an infrared sensor.

8. The method of claim 1, further comprising updating the stored indication and detected changes in the detected first signal strength when a subsequent user input gesture is received.

9. A system comprising:
a wearable wireless device comprising a memory, one or more processors, and a wireless interface for wirelessly communicating with at least one second device, wherein the one or more processor processors of the wearable wireless device are configured to:
receive a machine-learned model, the machine-learned model trained based on:
training user input gestures, the training user input gestures including at least one training user input gesture received by the wearable wireless device; and
a detected change in a training signal strength during the reception by the wearable wireless device of the at least one training user input gesture;
detect a first signal strength between the wearable wireless first device and the at least one second device that is wirelessly coupled to the wearable wireless first device;
identify a change in the detected first signal strength; and
determine, based on the change in the detected first signal strength and using the machine-learned model trained based on the at least one training user input gesture received by the wearable wireless device and the detected change in the training signal strength, a user input gesture corresponding to the change in the detected first signal strength.

10. The system of claim 9, wherein the wearable wireless device is a first earbud of a pair of earbuds and the at least one second device is a second earbud of the pair of earbuds.

11. The system of claim 9, wherein the one or more processors of the wearable wireless device are further configured to:
   detect a second signal strength between the wearable wireless device and a host device; and
   identify a change in the detected second signal strength;
   wherein determining the user input gesture is further based on the change in the detected second signal strength.

12. The system of claim 9, wherein the user input gesture is a non-contact gesture.

13. The system of claim 12, wherein the non-contact gesture includes one of a swipe gesture or a hold gesture near the first device.

14. The system of claim 9, wherein the wearable wireless device further comprises one or more sensors, and wherein the one or more processors of the wearable wireless device are further configured to:
   detect, using the one or more sensors, the user input gesture; and
   correlate the detection of the user input gesture by the one or more sensors with the identified change in the detected first signal strength.

15. The system of claim 14, wherein the one or more sensors include at least one of a touch sensor or an infrared sensor.

16. The system of claim 9, wherein the one or more processors of the wearable wireless device are further configured to update the stored indication and detected changes in the detected first signal strength when a subsequent user input gesture is received.

17. A non-transitory computer-readable medium storing instructions executable by one or more processors for performing a method for detecting input, the method comprising:
   receiving a machine-learned model, the machine-learned model trained based on:
      training user input gestures, the training user input gestures including at least one training user input gesture received by a first device; and
      a detected change in a training signal strength during the reception by the first device of the at least one training user input gesture;
   detecting, by the first device, a first signal strength between the first device and a second device that is wirelessly coupled to the first device;
   identifying, by the first device, a change in the detected first signal strength; and
   determining, by the first device based on the change in the detected first signal strength and using the machine-learned model trained based on the at least one training user input gesture received by the first device and the detected change in the training signal strength, a user input gesture corresponding to the change in the detected first signal strength.

18. The non-transitory computer-readable medium of claim 17, wherein the first device is a first earbud of a pair of earbuds and the second device is a second earbud of the pair of earbuds.

19. The non-transitory computer-readable medium of claim 17, the method further comprising:
   detecting, by the first device, a second signal strength between the first device and a host device; and
   identifying, by the first device, a change in the detected second signal strength;
   wherein determining the user input gesture is further based on the change in the detected second signal strength.

20. The non-transitory computer-readable medium of claim 17, wherein the user input gesture is a non-contact gesture.

* * * * *

UNITED STATES PATENT AND TRADEMARK OFFICE
CERTIFICATE OF CORRECTION

PATENT NO. : 11,995,242 B2
APPLICATION NO. : 17/419364
DATED : May 28, 2024
INVENTOR(S) : Wenjing Su and Jiang Zhu Page 1 of 1

It is certified that error appears in the above-identified patent and that said Letters Patent is hereby corrected as shown below:

In the Claims

Column 10, Line 45: After "more" before "processors", delete "processor"
Column 10, Lines 56-57: After "wireless" before "device and", delete "first"
Column 10, Line 58: After "wireless", delete "first"

Signed and Sealed this
Tenth Day of December, 2024

Katherine Kelly Vidal
*Director of the United States Patent and Trademark Office*